United States Patent
Lin et al.

(10) Patent No.: US 12,112,744 B2
(45) Date of Patent: Oct. 8, 2024

(54) MULTIMODAL SPEECH RECOGNITION METHOD AND SYSTEM, AND COMPUTER-READABLE STORAGE MEDIUM

(71) Applicant: Zhejiang University, Hangzhou (CN)

(72) Inventors: Feng Lin, Hangzhou (CN); Tiantian Liu, Hangzhou (CN); Ming Gao, Hangzhou (CN); Chao Wang, Hangzhou (CN); Zhongjie Ba, Hangzhou (CN); Jinsong Han, Hangzhou (CN); Wenyao Xu, Hangzhou (CN); Kui Ren, Hangzhou (CN)

(73) Assignee: Zhejiang University, Hangzhou (CN)

( * ) Notice: Subject to any disclaimer, the term of this patent is extended or adjusted under 35 U.S.C. 154(b) by 356 days.

(21) Appl. No.: 17/684,958

(22) Filed: Mar. 2, 2022

(65) Prior Publication Data
US 2023/0047666 A1    Feb. 16, 2023

(30) Foreign Application Priority Data
Aug. 10, 2021  (CN) .......................... 202110913351.1

(51) Int. Cl.
G10L 15/20    (2006.01)
G01S 13/88    (2006.01)
(Continued)

(52) U.S. Cl.
CPC .............. *G10L 15/20* (2013.01); *G01S 13/88* (2013.01); *G10L 15/063* (2013.01);
(Continued)

(58) Field of Classification Search
CPC ... G10L 15/20; G10L 15/063; G10L 15/1815; G10L 15/22; G10L 15/28; G10L 25/18;
(Continued)

(56) References Cited

U.S. PATENT DOCUMENTS

| | | | |
|---|---|---|---|
| 6,405,168 B1* | 6/2002 | Bayya | G10L 25/87 |
| | | | 704/E11.005 |
| 2011/0153326 A1* | 6/2011 | Garudadri | G10L 15/30 |
| | | | 704/E15.001 |

(Continued)

OTHER PUBLICATIONS

Liu, Tiantian, Ming Gao, Feng Lin, Chao Wang, Zhongjie Ba, Jinsong Han, Wenyao Xu, and Kui Ren. "Wavoice: A Noise-resistant Multi-modal Speech Recognition System Fusing mmWave and Audio Signals." (2021). (Year: 2021).*

(Continued)

*Primary Examiner* — Mark Villena
*Assistant Examiner* — Zeeshan Mahmood Shaikh
(74) *Attorney, Agent, or Firm* — McDonnell Boehnen Hulbert & Berghoff LLP (57) ABSTRACT

The disclosure provides a multimodal speech recognition method and system, and a computer-readable storage medium. The method includes calculating a first logarithmic mel-frequency spectral coefficient and a second logarithmic mel-frequency spectral coefficient when a target millimeter-wave signal and a target audio signal both contain speech information corresponding to a target user; inputting the first and the second logarithmic mel-frequency spectral coefficient into a fusion network to determine a target fusion feature, where the fusion network includes at least a calibration module and a mapping module, the calibration module is configured to perform mutual feature calibration on the target audio/millimeter-wave signals, and the mapping module is configured to fuse a calibrated millimeter-wave feature and a calibrated audio feature; and inputting the target fusion feature into a semantic feature network to determine a speech recognition result corresponding to the target user. The disclosure can implement high-accuracy speech recognition.

14 Claims, 4 Drawing Sheets

(51) Int. Cl.
*G10L 15/06* (2013.01)
*G10L 15/18* (2013.01)
*G10L 15/22* (2006.01)
*G10L 15/28* (2013.01)
*G10L 25/18* (2013.01)
*G10L 25/78* (2013.01)

(52) U.S. Cl.
CPC .......... *G10L 15/1815* (2013.01); *G10L 15/22* (2013.01); *G10L 15/28* (2013.01); *G10L 25/18* (2013.01); *G10L 25/78* (2013.01)

(58) Field of Classification Search
CPC ......... G10L 25/78; G10L 15/24; G10L 15/16; G10L 25/51; G10L 15/02; G10L 17/00; G10L 15/00; G10L 15/005; G10L 2019/0016; G10L 2021/02085; G10L 15/32; G10L 25/84; G10L 21/0272; G10L 17/26; G10L 19/02; G10L 21/00; G10L 25/93; G10L 2021/02165; G10L 25/00; G01S 13/88; G01S 13/52; G01S 13/86; Y02D 30/70

See application file for complete search history.

(56) References Cited

U.S. PATENT DOCUMENTS

| 2014/0112556 A1* | 4/2014 | Kalinli-Akbacak | G06V 40/176 382/128 |
| 2014/0365221 A1* | 12/2014 | Ben-Ezra | G10L 15/25 704/256.1 |
| 2023/0008363 A1* | 1/2023 | Liu | G06V 10/82 |

OTHER PUBLICATIONS

Xu, Chenhan, Zhengxiong Li, Hanbin Zhang, Aditya Singh Rathore, Huining Li, Chen Song, Kun Wang, and Wenyao Xu. "WaveEar: Exploring a mmWave-based Noise-resistant Speech Sensing for Voice-User Interface." In the 17th Annual International Conference on Mobile Systems, Applications, and Services. 2019. (Year: 2019).*

Wang, Qilong, Banggu Wu, Pengfei Zhu, Peihua Li, Wangmeng Zuo, and Qinghua Hu. "ECA-Net: Efficient Channel Attention for Deep Convolutional Neural Networks." (Year: 2020).*

Yu, Jianwei, Shi-Xiong Zhang, Jian Wu, Shahram Ghorbani, Bo Wu, Shiyin Kang, Shansong Liu, Xunying Liu, Helen Meng, and Dong Yu. "Audio-Visual Recognition of Overlapped Speech for the LRS2 Dataset." (Year: 2020).*

* cited by examiner

MULTIMODAL SPEECH RECOGNITION METHOD AND SYSTEM, AND COMPUTER-READABLE STORAGE MEDIUM

CROSS REFERENCE TO RELATED APPLICATION(S)

This patent application claims the benefit and priority of Chinese Patent Application No. 202110913351.1 filed on Aug. 10, 2021, the disclosure of which is incorporated herein by reference in its entirety.

TECHNICAL FIELD

The present disclosure relates to the technical field of speech recognition, and in particular, to a multimodal speech recognition method and system, and a computer-readable storage medium.

BACKGROUND ART

Speech interaction plays a vital role in intelligent interaction scenarios, such as smart households. Speech interaction provides non-contact man-machine interaction between people and Internet of Things (IoT) devices. Benefiting from the development of deep learning and natural language processing, an automatic speech recognition technology enables speech-interactive devices to accurately obtain what users speak. In recent years, commercial speech interaction products have become increasingly popular, such as smart speakers (for example, Amazon Echo and Google Home), voice assistants (for example, Siri) in smartphones, and in-vehicle speech control interaction (for example, speech interaction in Tesla Model S, X, 3, and Y).

In addition to home scenarios, today's speech interaction needs to address more diverse ambient noise (for example, traffic noise, commercial noise, and nearby sounds) in public places (for example, streets, stations, halls, or gatherings). However, a speech recognition technology based on microphone arrays and audio requires that an audio signal has a high signal-to-noise ratio and be clear. Therefore, in a noisy environment, an audio signal drowned in unpredictable noise becomes difficult to recognize. In addition, speech quality deteriorates as a recognition distance increases, thereby affecting recognition accuracy. To resolve these difficulties, researchers use multi-sensor information fusion for speech enhancement and recognition. For example, an audio-visual method combines lip motion captured by a camera with noisy sounds, but is limited by lighting conditions, line-of-sight requirements, or coverings. Although a working distance of an ultrasound-assisted speech enhancement technology is extremely short (below 20 cm), a specific posture is required.

SUMMARY

The present disclosure provides a multimodal speech recognition method and system, and a computer-readable storage medium to implement high-accuracy speech recognition.

To implement the foregoing objective, the present disclosure provides the following solutions:

A multimodal speech recognition method includes:
  obtaining a target millimeter-wave signal and a target audio signal;
  calculating a first logarithmic mel-frequency spectral coefficient and a second logarithmic mel-frequency spectral coefficient when the target millimeter-wave signal and the target audio signal both contain speech information corresponding to a target user, where the first logarithmic mel-frequency spectral coefficient is determined based on the target millimeter-wave signal, and the second logarithmic mel-frequency spectral coefficient is determined based on the target audio signal;
  inputting the first logarithmic mel-frequency spectral coefficient and the second logarithmic mel-frequency spectral coefficient into a fusion network to determine a target fusion feature, where the fusion network includes at least a calibration module and a mapping module; the calibration module is configured to perform feature calibration on the target millimeter-wave signal based on the target audio signal to obtain a calibrated millimeter-wave feature and perform feature calibration on the target audio signal based on the target millimeter-wave signal to obtain a calibrated audio feature; and the mapping module is configured to fuse the calibrated millimeter-wave feature and the calibrated audio feature to obtain the target fusion feature; and
  inputting the target fusion feature into a semantic feature network to determine a speech recognition result corresponding to the target user.

Optionally, obtaining the target millimeter-wave signal and the target audio signal, may specifically include:
  obtaining the target millimeter-wave signal acquired by a millimeter-wave radar; and
  obtaining the target audio signal acquired by a microphone.

Optionally, calculating the first logarithmic mel-frequency spectral coefficient and the second logarithmic mel-frequency spectral coefficient when the target millimeter-wave signal and the target audio signal both contain the speech information corresponding to the target user, may specifically include:
  determining whether the target millimeter-wave signal and the target audio signal both contain the speech information to obtain a first determining result;
  when the first determining result indicates that the target millimeter-wave signal and the target audio signal both contain the speech information, determining whether the target millimeter-wave signal and the target audio signal both come from the target user to obtain a second determining result; and
  when the second determining result indicates that the target millimeter-wave signal and the target audio signal both come from the target user, performing short-time Fourier transform (STFT) on the target millimeter-wave signal and the target audio signal to determine the first logarithmic mel-frequency spectral coefficient and the second logarithmic mel-frequency spectral coefficient.

Optionally, determining whether the target millimeter-wave signal and the target audio signal both contain the speech information to obtain the first determining result, may specifically include:
  preprocessing the target millimeter-wave signal and the target audio signal;
  performing fast Fourier transform (FFT) on the preprocessed target millimeter-wave signal to extract a millimeter-wave phase signal;

performing a difference operation on the millimeter-wave phase signal to extract a millimeter-wave phase difference signal;

multiplying a preprocessed target audio signal and the millimeter-wave phase difference signal to obtain a target product component;

calculating a spectral entropy of the target product component; and determining whether the spectral entropy is greater than a specified threshold; where when the spectral entropy is greater than the specified threshold, it indicates that the target millimeter-wave signal and the target audio signal both contain the speech information.

Optionally, determining whether the target millimeter-wave signal and the target audio signal both come from the target user, may specifically include:

processing the target product component to extract a target linear prediction coding (LPC) component; and inputting the target LPC component into a trained one-class support vector machine (OC-SVM) to determine whether the target millimeter-wave signal and the target audio signal both come from the target user; where the trained OC-SVM is determined based on training data and an OC-SVM; the training data includes a plurality of calibration product components and a label corresponding to each the calibration product component; the label is a calibration user; and the calibration product component is a product component determined based on a millimeter-wave signal and an audio signal corresponding to the calibration user.

Optionally, the fusion network may further include two identical branch networks, namely, a first branch network and a second branch network; and each branch network may include a first residual block with efficient channel attention (ResECA), a second ResECA, a third ResECA, a fourth ResECA, and a fifth ResECA; where input ends of the calibration module are respectively connected to an output end of the third ResECA of the first branch network and an output end of the third ResECA of the second branch network; and output ends of the calibration module are respectively connected to an input end of the fourth ResECA of the first branch network and an input end of the fourth ResECA of the second branch network;

an input end of the first ResECA of the first branch network is used to input the first logarithmic mel-frequency spectral coefficient; and an output end of the first ResECA of the first branch network is connected to an input end of the second ResECA of the first branch network, an output end of the second ResECA of the first branch network is connected to an input end of the third ResECA of the first branch network, and an output end of the fourth ResECA of the first branch network is connected to an input end of the fifth ResECA of the first branch network;

an input end of the first ResECA of the second branch network is used to input the second logarithmic mel-frequency spectral coefficient; and an output end of the first ResECA of the second branch network is connected to an input end of the second ResECA of the second branch network, an output end of the second ResECA of the second branch network is connected to an input end of the third ResECA of the second branch network, and an output end of the fourth ResECA of the second branch network is connected to an input end of the fifth ResECA of the second branch network; and input ends of the mapping module are respectively connected to an output end of the fifth ResECA of the first branch network and an output end of the fifth ResECA of the second branch network.

Optionally, the feature calibration performed by the calibration module may specifically include:

calculating a first channel feature distribution based on a first intermediate feature, where the first intermediate feature is a signal output by the output end of the third ResECA of the first branch network;

calculating a second channel feature distribution based on a second intermediate feature, where the second intermediate feature is a signal output by the output end of the third ResECA of the second branch network;

calibrating the first intermediate feature based on the second channel feature distribution; and calibrating the second intermediate feature based on the first channel feature distribution.

Optionally, the fusion performed by the mapping module may specifically include:

calculating a first similarity matrix based on the calibrated millimeter-wave feature;

calculating a second similarity matrix based on the calibrated audio feature;

normalizing the first similarity matrix and the second similarity matrix respectively;

calculating a first attention feature based on the normalized first similarity matrix;

calculating a second attention feature based on the normalized second similarity matrix; and calculating the target fusion feature based on the first attention feature and the second attention feature.

A multimodal speech recognition system includes:

a signal obtaining module, configured to obtain a target millimeter-wave signal and a target audio signal;

a logarithmic mel-frequency spectral coefficient calculating module, configured to calculate a first logarithmic mel-frequency spectral coefficient and a second logarithmic mel-frequency spectral coefficient when the target millimeter-wave signal and the target audio signal both contain speech information corresponding to a target user, where the first logarithmic mel-frequency spectral coefficient is determined based on the target millimeter-wave signal, and the second logarithmic mel-frequency spectral coefficient is determined based on the target audio signal;

a target fusion feature determining module, configured to input the first logarithmic mel-frequency spectral coefficient and the second logarithmic mel-frequency spectral coefficient into a fusion network to determine a target fusion feature, where the fusion network includes at least a calibration module and a mapping module; the calibration module is configured to perform feature calibration on the target millimeter-wave signal based on the target audio signal to obtain a calibrated millimeter-wave feature and perform feature calibration on the target audio signal based on the target millimeter-wave signal to obtain a calibrated audio feature; and the mapping module is configured to fuse the calibrated millimeter-wave feature and the calibrated audio feature to obtain the target fusion feature; and a speech recognition result extracting module, configured to input the target fusion feature into a semantic feature network to determine a speech recognition result corresponding to the target user.

A computer-readable storage medium is provided. The computer-readable storage medium stores a computer program. The computer program, when executed by a processor, implements the steps of the multimodal speech recognition method.

Based on specific embodiments provided in the present disclosure, the present disclosure has the following technical effects:

Considering that the millimeter-wave signal is not affected by noise and can perceive throat vibration information when a user is speaking, when the audio signal is polluted by noise, the present disclosure uses the fusion network to perform the mutual feature calibration and fusion on the millimeter-wave signal and the audio signal, that is, performs mutual calibration on a millimeter-wave feature and an audio feature and integrates vibration information in the millimeter-wave signal into the audio feature, to obtain the target fusion feature; and guides the semantic feature network to capture semantic information in the target fusion feature with high accuracy.

BRIEF DESCRIPTION OF THE DRAWINGS

To describe the technical solutions in embodiments of the present disclosure or in the prior art more clearly, the accompanying drawings required in the embodiments will be briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

To make the foregoing objective, features, and advantages of the present disclosure clearer and more comprehensible, the present disclosure will be further described in detail below with reference to the accompanying drawings and specific embodiments.

Terms in the present disclosure and their abbreviations:
FFT: Fast Fourier Transform
LPC: Linear Prediction Coding
OC-SVM: One-Class Support Vector Machine
STFT: Short-Time Fourier Transform
ResECA: Residual Block with Efficient Channel Attention
ReLU: Rectified Linear Unit
LAS: Listen, Attend, and Spell
pBLSTM: pyramidal Bidirectional Long Short Term Memory
LSTM: Long Short Term Memory Researches have proven that millimeter-wave signals have excellent resistance to ambient noise and penetration, and are helpful for speech information recovery. Based on the problems raised in the background art, the present disclosure uses a millimeter-wave radar as a supplement to speech recognition. The millimeter-wave radar can perceive a remote target user. Even if the user wears a mask in a noisy environment, a reflected signal received by the millimeter-wave radar still contains throat vibration information. However, performance of the millimeter-wave radar is not always satisfactory. A millimeter-wave signal has an extremely short wavelength (about 4 mm) and is very sensitive to both vocal vibration and motion vibration. Therefore, in practice, the millimeter-wave signal is affected by body motion of the user. Fortunately, microphone-based speech acquisition can make up for information loss to some extent. Therefore, the present disclosure considers complementary cooperation between the millimeter-wave radar and the microphone, and combines two different modal signals for speech recognition. To be specific, the millimeter-wave signal supports anti-noise speech perception, and an audio signal acquired by the microphone can be used as a guide for calibrating a millimeter-wave feature under motion interference.

In view of this, the present disclosure provides a multimodal speech recognition method and system that fuse a millimeter-wave signal and an audio signal. First, speech activity detection is performed and a user is determined based on a correlation between a millimeter-wave signal and an audio signal to obtain a millimeter-wave signal and an audio signal corresponding to the user. Then, the millimeter-wave signal and audio signal are input into a fusion network for full fusion to obtain a fusion feature. Finally, the fusion feature is input into a semantic extraction network to obtain semantic text, namely, a speech recognition result. The present disclosure integrates and enhances advantages of the millimeter-wave signal and audio signal, and implements high-accuracy speech recognition under harsh conditions such as high noise, a long distance, and a plurality of angles.

Embodiment 1

Figure 1:
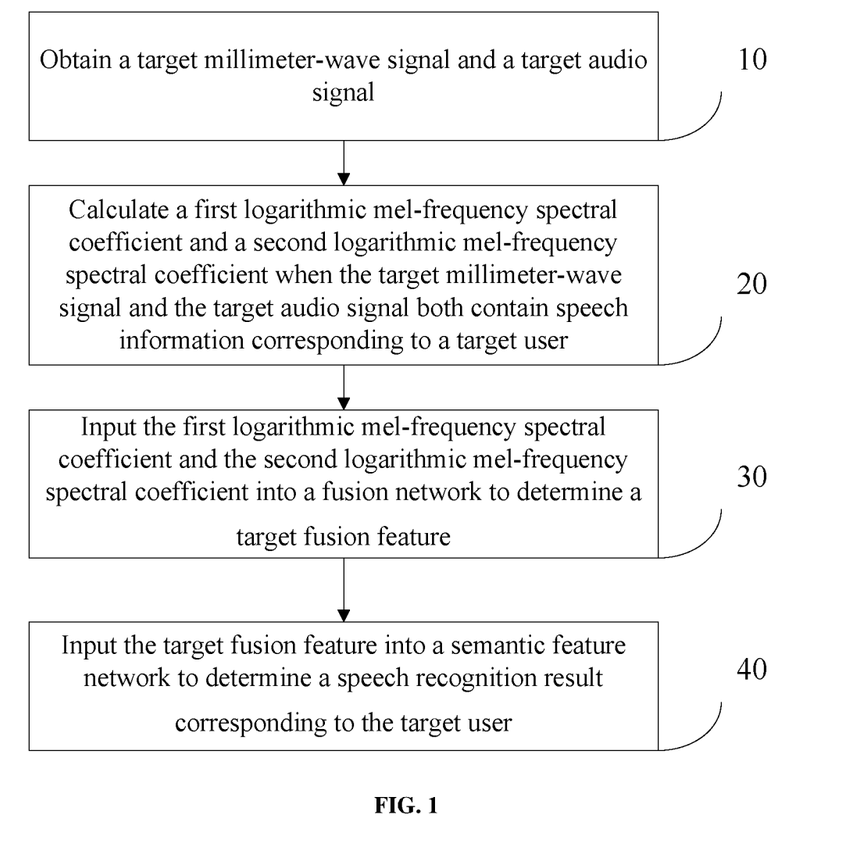
FIG. 1 is a schematic flowchart of a multimodal speech recognition method according to the present disclosure.

Referring to FIG. 1, a multimodal speech recognition method provided in this embodiment specifically includes:
step 10: obtaining a target millimeter-wave signal and a target audio signal;
step 20: calculating a first logarithmic mel-frequency spectral coefficient and a second logarithmic mel-frequency spectral coefficient when the target millimeter-wave signal and the target audio signal both contain speech information corresponding to a target user, where the first logarithmic mel-frequency spectral coefficient is determined based on the target millimeter-wave signal, and the second logarithmic mel-frequency spectral coefficient is determined based on the target audio signal;
step 30: inputting the first logarithmic mel-frequency spectral coefficient and the second logarithmic mel-frequency spectral coefficient into a fusion network to determine a target fusion feature, where the fusion network includes at least a calibration module and a mapping module; the calibration module is configured to perform feature calibration on the target millimeter-wave signal based on the target audio signal to obtain a calibrated millimeter-wave feature and perform feature calibration on the target audio signal based on the target millimeter-wave signal to obtain a calibrated audio feature; and the mapping module is configured to fuse the calibrated millimeter-wave feature and the calibrated audio feature to obtain the target fusion feature; and step 40: inputting the target fusion feature into a semantic feature network to determine a speech recognition result corresponding to the target user.

In a preferred implementation, the step 10 may specifically include:

obtaining the target millimeter-wave signal acquired by a millimeter-wave radar; and obtaining the target audio signal acquired by a microphone.

In a preferred implementation, the step 20 may specifically include:

determining whether the target millimeter-wave signal and the target audio signal both contain speech information to obtain a first determining result;

if the first determining result indicates that the target millimeter-wave signal and the target audio signal both contain the speech information, determining whether the target millimeter-wave signal and the target audio signal both come from the target user to obtain a second determining result; and if the second determining result indicates that the target millimeter-wave signal and the target audio signal both come from the target user, performing STFT on the target millimeter-wave signal and the target audio signal to determine the first logarithmic mel-frequency spectral coefficient and the second logarithmic mel-frequency spectral coefficient.

Further, determining whether the target millimeter-wave signal and the target audio signal both contain speech information to obtain the first determining result may specifically include:

preprocessing the target millimeter-wave signal and the target audio signal;

performing FFT on a preprocessed target millimeter-wave signal to extract a millimeter-wave phase signal;

performing a difference operation on the millimeter-wave phase signal to extract a millimeter-wave phase difference signal;

multiplying the preprocessed target audio signal and the millimeter-wave phase difference signal to obtain a target product component;

calculating a spectral entropy of the target product component; and determining whether the spectral entropy is greater than a specified threshold, where when the spectral entropy is greater than the specified threshold, it indicates that the target millimeter-wave signal and the target audio signal both contain the speech information.

Further, determining whether the target millimeter-wave signal and the target audio signal both come from the target user, may specifically include:

processing the target product component to extract a target LPC component; and inputting the target LPC component into a trained OC-SVM to determine whether the target millimeter-wave signal and the target audio signal both come from the target user, where the trained OC-SVM is determined based on training data and an OC-SVM; the training data includes a plurality of calibration product components and a label corresponding to each calibration product component; the label is a calibration user; and the calibration product component is a product component determined based on a millimeter-wave signal and an audio signal corresponding to the calibration user.

In a preferred implementation, the fusion network may further include two identical branch networks such as a first branch network and a second branch network. The branch network may include a first ResECA, a second ResECA, a third ResECA, a fourth ResECA, and a fifth ResECA.

Figure 4:
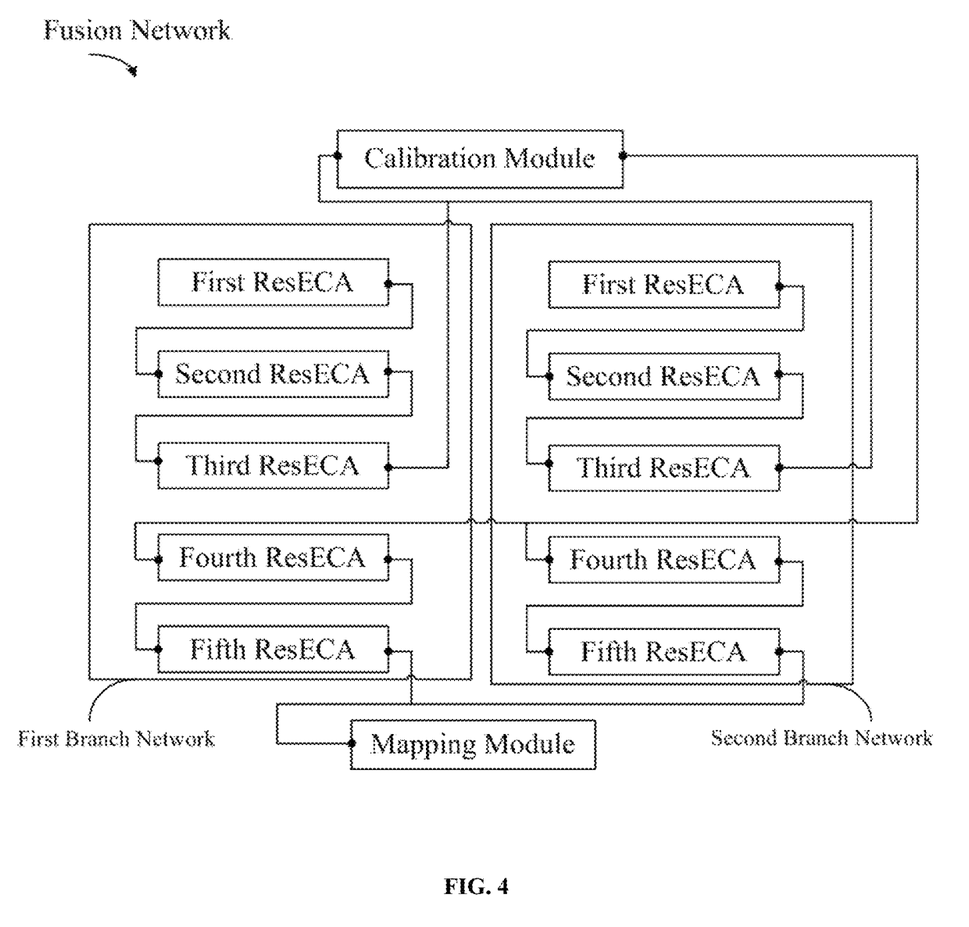
FIG. 4 is a schematic diagram of a structure of a fusion network according to the present disclosure.

In a preferred implementation, as shown in FIG. 4, the fusion network may further include two identical branch networks such as a first branch network and a second branch network. The branch network may include a first ResECA, a second ResECA, a third ResECA, a fourth ResECA, and a fifth ResECA.

An input end of the first ResECA of the first branch network is used to input the first logarithmic mel-frequency spectral coefficient. An output end of the first ResECA of the first branch network is connected to an input end of the second ResECA of the first branch network. An output end of the second ResECA of the first branch network is connected to an input end of the third ResECA of the first branch network. An output end of the fourth ResECA of the first branch network is connected to an input end of the fifth ResECA of the first branch network.

An input end of the first ResECA of the second branch network is used to input the second logarithmic mel-frequency spectral coefficient. An output end of the first ResECA of the second branch network is connected to an input end of the second ResECA of the second branch network. An output end of the second ResECA of the second branch network is connected to an input end of the third ResECA of the second branch network. An output end of the fourth ResECA of the second branch network is connected to an input end of the fifth ResECA of the second branch network.

Input ends of the mapping module are respectively connected to an output end of the fifth ResECA of the first branch network and an output end of the fifth ResECA of the second branch network.

Further, the feature calibration performed by the calibration module may specifically include:

calculating a first channel feature distribution based on a first intermediate feature, where the first intermediate feature is a signal output by the output end of the third ResECA of the first branch network;

calculating a second channel feature distribution based on a second intermediate feature, where the second intermediate feature is a signal output by the output end of the third ResECA of the second branch network;

calibrating the first intermediate feature based on the second channel feature distribution; and calibrating the second intermediate feature based on the first channel feature distribution.

Further, the fusion performed by the mapping module may specifically include:

calculating a first similarity matrix based on the calibrated millimeter-wave feature;

calculating a second similarity matrix based on the calibrated audio feature;

normalizing the first similarity matrix and the second similarity matrix respectively;

calculating a first attention feature based on the normalized first similarity matrix;

calculating a second attention feature based on the normalized second similarity matrix; and calculating the target fusion feature based on the first attention feature and the second attention feature.

Embodiment 2

Figure 2:
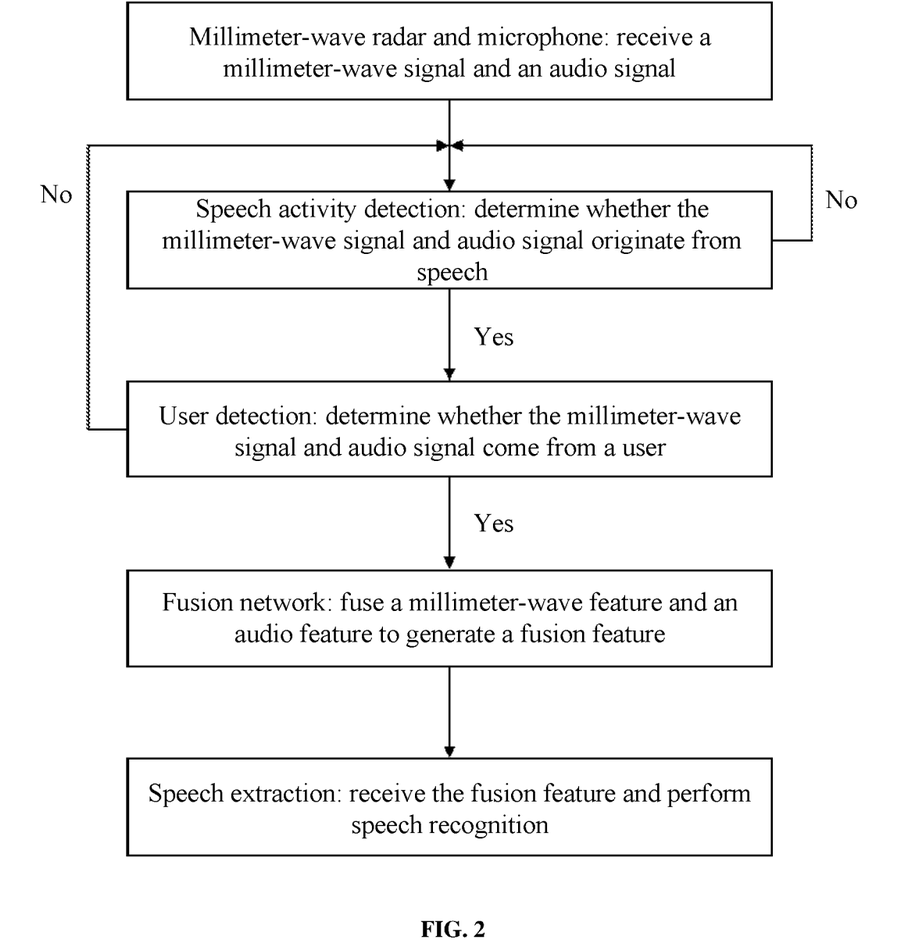
FIG. 2 is a schematic flowchart of a multimodal speech recognition method that fuses a millimeter-wave signal and an audio signal according to the present disclosure.

As shown in FIG. 2, this embodiment provides a multi-modal speech recognition method that fuses a millimeter-wave signal and an audio signal, including the following steps 1 to 4:

In step 1, a target user stands about 7 meters away from a millimeter-wave radar and a microphone, and speaks a wakeup word and a speech command. In this case, the millimeter-wave radar acquires a millimeter-wave signal, and the microphone acquires an audio signal.

First, both signals are clipped into 3 seconds in length, and then the signals are normalized and downsampled to 16 kHz. Next, FFT is performed on a downsampled millimeter-wave signal to extract a millimeter-wave phase signal, and a difference operation is performed on the millimeter-wave phase signal to extract a millimeter-wave phase difference signal. A downsampled audio signal and the millimeter-wave phase difference signal are multiplied to obtain a product component. Next, it is determined whether the millimeter-wave signal or the audio signal contains speech information.

A spectral entropy of the product component is calculated. If the spectral entropy is greater than a specified threshold, that is, greater than 0.83, it indicates that the millimeter-wave signal and the audio signal both contain speech information. Otherwise, it indicates that the millimeter-wave signal or the audio signal does not perceive speech information. The step 2 is performed on the millimeter-wave signal and the audio signal that perceive the speech information to determine whether the millimeter-wave signal and the audio signal both come from the target user, rather than interference from others.

In step 2, an LPC component is extracted from the product component, and the LPC component is input into a trained OC-SVM to determine whether the millimeter-wave signal and the audio signal both come from the target user. If the LPC component comes from the target user, step 3 will be performed. Otherwise, steps 1 and 2 will be performed. The trained OC-SVM is obtained through training based on a millimeter-wave signal and an audio signal corresponding to a calibration user in advance.

The training may include: the calibration user speaks the wakeup word to the millimeter-wave radar and microphone 30 times; the preprocessing in step 1 is performed on an acquired millimeter-wave signal and audio signal to obtain a calibration product component; and a calibration LPC component extracted from the calibration product component and the calibration user are used to train an OC-SVM to enable the OC-SVM to determine whether the LPC component comes from the target user.

In step 3, STFT is performed on the millimeter-wave signal and the audio signal containing speech information of the user; then, logarithmic mel-frequency spectral coefficients of a millimeter-wave signal and an audio signal obtained after the STFT, are respectively calculated; and finally, the logarithmic mel-frequency spectral coefficients are input into a fusion network to obtain a fusion feature.

The fusion network includes two branch networks. The branch networks respectively receive the logarithmic mel-frequency spectral coefficients from the millimeter-wave signal and the audio signal. Each branch network is composed of five ResECAs. The fusion network further includes two modules. One is a calibration module, configured to calibrate two input features, where the calibration module is located after a third ResECA, and output of the third ResECA passes through the calibration module and then flows into a fourth ResECA. The other is a mapping module, which maps the two features into a same feature space to obtain the final fusion feature, where the mapping module is located after a fifth ResECA and receives the millimeter-wave signal and the audio signal from the two branch networks respectively.

A mathematical principle of the calibration module is described. $X_W \in R^{H \times W \times C}$ and $X_S \in R^{H \times W \times C}$ are two intermediate features from their respective branch networks, where R represents a real number domain, H represents a width, W represents a length, C represents a size of channel dimensions, and subscripts W and S respectively represent the millimeter-wave signal and the audio signal. Channel feature distributions $Y_W$ and $Y_S$ of the two intermediate features are calculated.

$$Y_W = \sigma(W_W \text{ReLU}(\text{GAP}(X_W))), Y_W \in R^{1 \times 1 \times C} \quad (1)$$

$$Y_S = \sigma(W_S \text{ReLU}(\text{GAP}(X_S))), Y_S \in R^{1 \times 1 \times C} \quad (2)$$

where ReLU represents a ReLU function, $W_W$ and $W_S$ represent learning parameter matrices, $\sigma$ represents a sigmoid function, and GAP represents a global pooling function. The channel feature distributions $Y_W$ and $Y_S$ can be regarded as a feature detector and filter. Mutual feature calibration is implemented by using formulas (3) and (4):

$$\tilde{X}_W = Y_S \odot X_W + X_W, \tilde{X}_W \in R^{H \times W \times C} \quad (3)$$

$$\tilde{X}_S = Y_W \odot X_S + X_S, \tilde{X}_S \in R^{H \times W \times C} \quad (4)$$

$\tilde{X}_W$ and $\tilde{X}_S$ respectively represent a final calibrated millimeter-wave feature and audio feature. Based on a correlation between the two features, that is, the two features both containing the speech information of the user, the mutual calibration can enhance important information and suppress irrelevant interference information in respective feature maps.

To map two features from different feature spaces, namely, the millimeter-wave feature and audio feature, to the same feature space, the mapping module is designed and inserted at the end of the fusion network to generate the final fusion feature. Assuming that $M \in R^{H \times W \times C}$ and $V \in R^{H \times W \times C}$ are the millimeter-wave feature and the audio feature respectively from the branch networks, M and V are flattened into two-dimensional variables with a size of $R^{C \times HW}$. A similarity matrix of M and V is calculated.

$$S = M^T W_{MV} V, S \in R^{HW \times HW} \quad (5)$$

where $W_{MV}$ represents a learning parameter matrix, and each element of S reveals a correlation between corresponding columns of M and V. Softmax normalization and column normalization are respectively performed on the similarity matrix as follows:

$$S^M = \text{softmax}(S), S^M \in R^{HW \times HW} \quad (6)$$

$$S^V = \text{softmax}(S^T), S^V \in R^{HW \times HW} \quad (7)$$

The similarity matrix $S^M$ can convert a millimeter-wave feature space into an audio feature space. Similarly, the similarity matrix $S^V$ can convert the audio feature space into the millimeter-wave feature space. Corresponding attention features are calculated as follows:

$$C^M = V \otimes S^M, C^M \in R^{C \times HW} \quad (8)$$

$$C^V = M \otimes S^V, C^V \in R^{C \times HW} \quad (9)$$

⊗ represents matrix multiplication. Finally, the final fusion feature Z can be obtained based on the both attention features:

$$Z=W_Z\{\sigma(C^M)\odot M+\sigma(C^V)\odot V\}, Z\in R^{C\times HW} \quad (10)$$

where $W_Z$ is a learning parameter matrix, which represents Z with two modal features selectively integrates information. Fine-grained elements related to speech vibration and acoustic features in Z are dominant. The final fusion feature output by the fusion network is input into a semantic extraction network for speech recognition.

In step 4, the final fusion feature is input into a semantic feature network to obtain semantic text, namely, a speech recognition result. The semantic feature network in this method is classic LAS, where the LAS consists of two components: an encoder called Listener and a decoder called Speller. Listener uses a pBLSTM to map the fusion feature to a hidden feature. Speller is a superimposed recurrent neural network that calculates a probability of an output character sequence, which uses a multi-head attention mechanism to generate context vectors. In the LAS, Listener includes two consecutive pBLSTM layers, and Speller includes two LSTM layers and an output Softmax layer. After receiving the fusion feature in step 3, the LAS outputs the speech recognition result.

Embodiment 3

Figure 3:
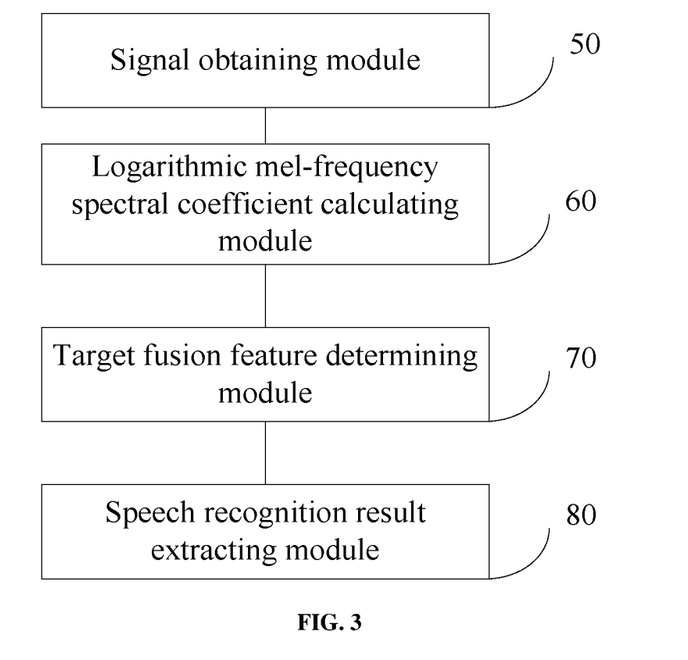
FIG. 3 is a schematic diagram of a structure of a multimodal speech recognition system according to the present disclosure.

Referring to FIG. 3, a multimodal speech recognition system provided in this embodiment includes:

a signal obtaining module 50, configured to obtain a target millimeter-wave signal and a target audio signal;

a logarithmic mel-frequency spectral coefficient calculating module 60, configured to calculate a first logarithmic mel-frequency spectral coefficient and a second logarithmic mel-frequency spectral coefficient when the target millimeter-wave signal and the target audio signal both contain speech information corresponding to a target user, where the first logarithmic mel-frequency spectral coefficient is determined based on the target millimeter-wave signal, and the second logarithmic mel-frequency spectral coefficient is determined based on the target audio signal;

a target fusion feature determining module 70, configured to input the first logarithmic mel-frequency spectral coefficient and the second logarithmic mel-frequency spectral coefficient into a fusion network to determine a target fusion feature, where the fusion network includes at least a calibration module and a mapping module; the calibration module is configured to perform feature calibration on the target millimeter-wave signal based on the target audio signal to obtain a calibrated millimeter-wave feature and perform feature calibration on the target audio signal based on the target millimeter-wave signal to obtain a calibrated audio feature; and the mapping module is configured to fuse the calibrated millimeter-wave feature and the calibrated audio feature to obtain the target fusion feature; and a speech recognition result extracting module 80, configured to input the target fusion feature into a semantic feature network to determine a speech recognition result corresponding to the target user.

Embodiment 4

This embodiment provides a computer-readable storage medium. The computer-readable storage medium stores a computer program.

When executed by a processor, the computer program implements the steps of the multimodal speech recognition method in Embodiment 1 or Embodiment 2.

Compared with the prior art, the present disclosure has the following effects:

1. Anti-noise: The millimeter-wave signal is not affected by noise and can perceive the throat vibration information when the user is speaking. When the audio signal is polluted by the noise, with the help of the fusion network, the mutual calibration and fusion can be performed on the millimeter-wave feature and the audio feature, that is, the vibration information in the millimeter-wave feature can be integrated into the audio feature, which may guide the network to capture semantic information in the audio feature, rather than noise interference.

2. Long recognition distance and wide angle: The millimeter-wave radar has a long perception distance, but its perception angle is limited. The microphone radar can capture omnidirectional sounds, but its perception distance is short. The two different modal features are input into the fusion network, and mutual calibration is selectively performed on the features to implement mutual enhancement, to finally generate the fusion feature that combines advantages of the two features. The fusion feature combines two types of modal information: long-distance throat vibration information from the millimeter-wave radar and omnidirectional speech information from the microphone radar.

3. Suitable for multi-person scenarios: The signals acquired by the millimeter-wave radar and microphone radar may not contain speech information or come from the user. Therefore, the designed speech activity detection and user detection are based on the correlation between the millimeter-wave signal and audio signal, e.g., both signals are related to speech information, and can detect whether the signals originate from speech information and further determine whether the signals come from the user, such that this method is suitable for noisy multi-person scenarios.

Each embodiment of this specification is described in a progressive manner, each embodiment focuses on the difference from other embodiments, and the same and similar parts between the embodiments may refer to each other. Since the system disclosed in the embodiments corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A multimodal speech recognition method, comprising:
obtaining a target millimeter-wave signal and a target audio signal;
calculating a first logarithmic mel-frequency spectral coefficient and a second logarithmic mel-frequency spectral coefficient when the target millimeter-wave signal and the target audio signal both contain speech information corresponding to a target user, wherein the first logarithmic mel-frequency spectral coefficient is determined based on the target millimeter-wave signal, and the second logarithmic mel-frequency spectral coefficient is determined based on the target audio signal;

inputting the first logarithmic mel-frequency spectral coefficient and the second logarithmic mel-frequency spectral coefficient into a fusion network to determine a target fusion feature, wherein the fusion network comprises at least a calibration module and a mapping module; the calibration module is configured to perform feature calibration on the target millimeter-wave signal based on the target audio signal to obtain a calibrated millimeter-wave feature and perform feature calibration on the target audio signal based on the target millimeter-wave signal to obtain a calibrated audio feature; and the mapping module is configured to fuse the calibrated millimeter-wave feature and the calibrated audio feature to obtain the target fusion feature; and inputting the target fusion feature into a semantic feature network to determine a speech recognition result corresponding to the target user, wherein the fusion network further comprises two identical branch networks including a first branch network and a second branch network; and each branch network comprises a first residual block with efficient channel attention (ResECA), a second ResECA, a third ResECA, a fourth ResECA, and a fifth ResECA; wherein an input end of the calibration module is respectively connected to an output end of the third ResECA of the first branch network and an output end of the third ResECA of the second branch network; and an output end of the calibration module is respectively connected to an input end of the fourth ResECA of the first branch network and an input end of the fourth ResECA of the second branch network;

an input end of the first ResECA of the first branch network is used to input the first logarithmic mel-frequency spectral coefficient; and an output end of the first ResECA of the first branch network is connected to an input end of the second ResECA of the first branch network, an output end of the second ResECA of the first branch network is connected to an input end of the third ResECA of the first branch network, and an output end of the fourth ResECA of the first branch network is connected to an input end of the fifth ResECA of the first branch network;

an input end of the first ResECA of the second branch network is used to input the second logarithmic mel-frequency spectral coefficient; and an output end of the first ResECA of the second branch network is connected to an input end of the second ResECA of the second branch network, an output end of the second ResECA of the second branch network is connected to an input end of the third ResECA of the second branch network, and an output end of the fourth ResECA of the second branch network is connected to an input end of the fifth ResECA of the second branch network; and an input end of the mapping module is respectively connected to an output end of the fifth ResECA of the first branch network and an output end of the fifth ResECA of the second branch network.

2. The multimodal speech recognition method according to claim 1, wherein obtaining the target millimeter-wave signal and the target audio signal comprises:
obtaining the target millimeter-wave signal acquired by a millimeter-wave radar; and
obtaining the target audio signal acquired by a microphone.

3. The multimodal speech recognition method according to claim 1, wherein calculating the first logarithmic mel-frequency spectral coefficient and the second logarithmic mel-frequency spectral coefficient when the target millimeter-wave signal and the target audio signal both contain the speech information corresponding to the target user, comprises:
determining whether the target millimeter-wave signal and the target audio signal both contain the speech information to obtain a first determining result;
when the first determining result indicates that the target millimeter-wave signal and the target audio signal both contain the speech information, determining whether the target millimeter-wave signal and the target audio signal both come from the target user to obtain a second determining result; and
when the second determining result indicates that the target millimeter-wave signal and the target audio signal both come from the target user, performing short-time Fourier transform (STFT) on the target millimeter-wave signal and the target audio signal to determine the first logarithmic mel-frequency spectral coefficient and the second logarithmic mel-frequency spectral coefficient.

4. The multimodal speech recognition method according to claim 3, wherein determining whether the target millimeter-wave signal and the target audio signal both contain the speech information to obtain the first determining result, comprises:
preprocessing the target millimeter-wave signal and the target audio signal;
performing fast Fourier transform (FFT) on the preprocessed target millimeter-wave signal to extract a millimeter-wave phase signal;
performing a difference operation on the millimeter-wave phase signal to extract a millimeter-wave phase difference signal;
multiplying a preprocessed target audio signal and the millimeter-wave phase difference signal to obtain a target product component;
calculating a spectral entropy of the target product component; and
determining whether the spectral entropy is greater than a specified threshold;
wherein when the spectral entropy is greater than the specified threshold, it indicates that the target millimeter-wave signal and the target audio signal both contain the speech information.

5. The multimodal speech recognition method according to claim 4, wherein determining whether the target millimeter-wave signal and the target audio signal both come from the target user, comprises:
processing the target product component to extract a target linear prediction coding (LPC) component; and
inputting the target LPC component into a trained one-class support vector machine (OC-SVM) to determine whether the target millimeter-wave signal and the target audio signal both come from the target user;
wherein the trained OC-SVM is determined based on training data and an OC-SVM; the training data comprises a plurality of calibration product components and a label corresponding to each calibration product component; the label is a calibration user; and the calibration product component is a product component determined based on a millimeter-wave signal and an audio signal corresponding to the calibration user.

6. The multimodal speech recognition method according to claim 1, wherein the feature calibration performed by the calibration module comprises:

calculating a first channel feature distribution based on a first intermediate feature, wherein the first intermediate feature is a signal output by the output end of the third ResECA of the first branch network;

calculating a second channel feature distribution based on a second intermediate feature, wherein the second intermediate feature is a signal output by the output end of the third ResECA of the second branch network;

calibrating the first intermediate feature based on the second channel feature distribution; and calibrating the second intermediate feature based on the first channel feature distribution.

7. The multimodal speech recognition method according to claim 1, wherein the fusion performed by the mapping module comprises:

calculating a first similarity matrix based on the calibrated millimeter-wave feature;

calculating a second similarity matrix based on the calibrated audio feature;

normalizing the first similarity matrix and the second similarity matrix respectively;

calculating a first attention feature based on the normalized first similarity matrix;

calculating a second attention feature based on the normalized second similarity matrix; and calculating the target fusion feature based on the first attention feature and the second attention feature.

8. A non-transitory computer-readable storage medium, wherein the computer-readable storage medium stores a computer program, and the computer program, when executed by a processor, implements the multimodal speech recognition method according to claim 1.

9. A non-transitory computer-readable storage medium, wherein the computer-readable storage medium stores a computer program, and the computer program, when executed by a processor, implements the multimodal speech recognition method according to claim 2.

10. A non-transitory computer-readable storage medium, wherein the computer-readable storage medium stores a computer program, and the computer program, when executed by a processor, implements the multimodal speech recognition method according to claim 3.

11. A non-transitory computer-readable storage medium, wherein the computer-readable storage medium stores a computer program, and the computer program, when executed by a processor, implements the multimodal speech recognition method according to claim 4.

12. A non-transitory computer-readable storage medium, wherein the computer-readable storage medium stores a computer program, and the computer program, when executed by a processor, implements the multimodal speech recognition method according to claim 5.

13. A non-transitory computer-readable storage medium, wherein the computer-readable storage medium stores a computer program, and the computer program, when executed by a processor, implements the multimodal speech recognition method according to claim 6.

14. A non-transitory computer-readable storage medium, wherein the computer-readable storage medium stores a computer program, and the computer program, when executed by a processor, implements the multimodal speech recognition method according to claim 7.

* * * * *